Nov. 9, 1943.                    F. W. MEREDITH                    2,334,115
                                HYDRAULIC APPARATUS
                              Filed Oct. 19, 1942
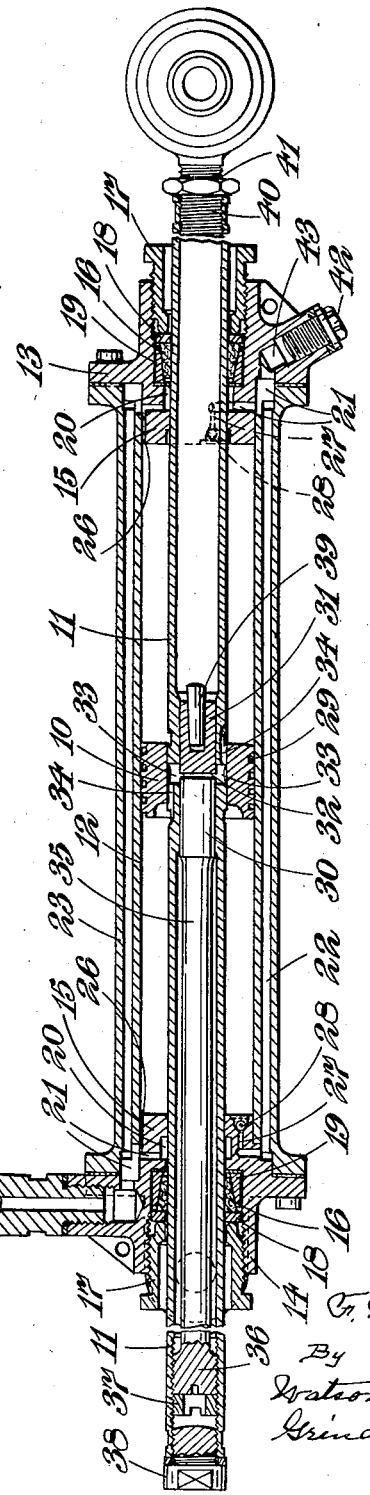
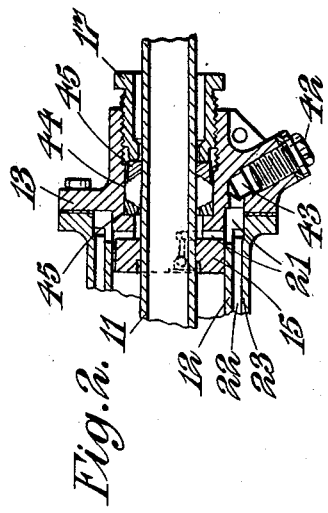
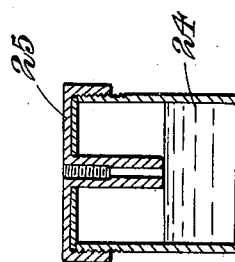
Inventor
F. W. Meredith
By
Watson, Cole,
Grindle & Watson
Attorneys Patented Nov. 9, 1943

2,334,115

UNITED STATES PATENT OFFICE 2,334,115

HYDRAULIC APPARATUS

Frederick William Meredith, Cricklewood, London, England, assignor to S. Smith & Sons (Motor Accessories) Limited, Cricklewood, London, England, a British company Application October 19, 1942, Serial No. 462,567
In Great Britain June 5, 1941

8 Claims. (Cl. 188—96)

This invention relates to hydraulic apparatus of the kind comprising a pressure chamber in which a hydraulic pressure may be obtained and a relatively movable part passing through a wall of the chamber, a high-pressure seal being provided between this part and the wall of the chamber through which it passes. One example of this kind of apparatus is a piston and cylinder device operating as a pump or motor or a dashpot. In practice, there is usually some leakage of the liquid past the seal, and the chief object of the invention is to provide an apparatus in which this leakage is prevented.

According to the invention there is provided a hydraulic apparatus of the kind specified comprising an outer chamber enclosing said seal and encircling said relatively movable part so that any liquid leaking past the seal goes into the chamber and a header tank connected to this outer chamber and charged with the operating liquid so as to maintain said seal drowned. Thus, any liquid leaking past the seal merely passes into the outer chamber which is not subjected to pressure. The outer chamber may be closed around the relatively movable part by means of a simple soft low pressure packing. Furthermore, under conditions of low pressure in the pressure chamber liquid may leak past the high pressure seal in the reverse direction, to prevent cavitation or vaporization of the liquid, but preferably passages are provided connecting the header tank or the outer chambers with the pressure chambers, these passages containing non-return valves permitting fluid to flow past the valves into the pressure chambers.

One application of the invention is to a piston and cylinder device in which the piston rod extends on opposite sides of a piston out through high pressure sealing means in opposite ends of the cylinder, and according to a further feature of the invention an outer chamber encloses each sealing means and encircles the piston rod at each end of the cylinder which outer chambers both communicate with a space within an outer cylinder which encircles the pressure chamber. The outer cylinder is thus charged with the fluid at low pressure in addition to the outer chambers at its ends and only a single header tank is required communicating for instance with one of the outer chambers. The pressure cylinder and the high pressure seals are thus completely enclosed so as to prevent any leakage of liquid taking place.

The invention is more specifically concerned with piston and cylinder dashpot devices containing a liquid which passes through bleed passages and a further feature of the invention consists in compensating for temperature effects on the viscosity of the liquid by the differential expansion of two different metal members for controlling one of said bleed passages one of which members is constituted by the piston rod.

The following is a description of one form of piston and cylinder dashpot device according to this invention, reference being made to the accompanying drawing, in which:

Figure 1 is a longitudinal section through the device, and

Figure 2 is a section through an alternative form of low pressure packing.

The piston 10 is fixed to a piston rod 11 extending from both ends of the cylinder 12 and the cylinder is closed by end caps 13 and 14 each formed with high pressure sealing bearing 15 around the piston rod. Each end cap also houses a soft packing 16 which is pressed by a gland nut 17 and a washer 18 into a space between a retaining ring 19 and the piston rod. Between the high pressure sealing bearing and soft packing in each end cap there is an outer or low pressure chamber 20 of annular form around the piston rod and these chambers are connected by passages 21 formed in the end caps to an annular space 22 within an outer cylinder 23 enclosing the pressure chamber, the ends of this outer cylinder being closed on the end caps 13 and 14. The end cap 14 carries a small header tank 24 which communicates with the low pressure chamber 20 in this end cap and through the annular space 22 with the low pressure chamber 20 of the other end cap 13. A head of operating liquid is maintained in the header tank so that the two low pressure chambers and the outer annular space 22 are maintained charged with liquid. The header tank is provided with a non-spilling cap 25. With this arrangement, no air can be drawn into the pressure cylinder but it must be expected that, due to changes of temperature and/or pressure, dissolved air, will, from time to time, be released from the liquid. To enable this air to escape a small leak passage 26 is provided in the upper side of each end cap leading past the high pressure sealing bearing so as to permit such air to leak through the liquid in the header tank to atmosphere. Any air freed in the pressure cylinder at the side of the piston remote from the header tank will find its way through the annular space 22 to the passage 21 and thence to the header tank. In each of the end caps there is a passage 27 between the low pressure chamber and the interior of the pressure cylinder, which passage contains a non-return valve 28 permitting flow of liquid from the chamber into the pressure cylinder to maintain the cylinder fully charged with the liquid.

The cylindrical wall of the piston is formed with a spiral duct 29 extending between opposite faces of the piston and providing a long leak path with a sufficiently low Reynolds number to ensure viscous flow, namely, a velocity of flow proportional to pressure. The piston rod is of tubular form and contains two flat-ended plugs 30 and 31 having a space 32 between them communicating with two holes 33 in the piston rod at opposite sides of these plugs, one hole communicating with one face of the piston and the other hole communicating with the opposite face of the piston through passages 34. The plug 30 is mounted on one end of an aluminium rod 35 located within the tubular piston rod, which is of steel, and adjustably anchored at the other end to the piston rod by a screw-threaded connection 36, a lock nut 37 being provided for maintaining the adjustment. The end of the tubular piston rod is closed by a screw plug 38. The other plug 31 is permanently fixed in the piston rod by being expanded into it by a taper cotter pin 39. The other end of the piston rod is also closed by a plug 40 which is provided with a connection 41 for attachment to the apparatus with which the dashpot is to be used. Thus, with a change in temperature the difference of expansion of the aluminium rod 35 and the steel piston rod 11 causes the space between the plugs 30 and 31 to vary and so vary the leak passage provided by this space between opposite faces of the piston so as to compensate for variation of the viscosity of the liquid with variation of temperature. A drain plug 42 is provided in the end cap 13 and closes a drain passage 43 which communicates with the passages 21.

An alternative form of soft packing is shown in Figure 2. In this case a string type of pack 44 is disposed between two dished washers 45 one of which is engaged by the gland nut 17 and the other of which rests on a shoulder formed in the end cap 13.

I claim:

1. A hydraulic apparatus comprising a container providing a pressure chamber and having end walls rigid therewith, a relatively movable part passing through one of said end walls, a high pressure seal between said part and said wall, an outer chamber enclosing said seal and encircling said relatively movable part, a soft low pressure packing arranged between said low pressure chamber and relatively movable part and a header tank charged with operating liquid and connected to this outer chamber and adapted to maintain said seal drowned.

2. A hydraulic apparatus comprising a pressure chamber, a relatively movable part passing through a wall of the chamber, a high pressure seal between said part and said wall, which high pressure seal is provided with a passage, a non-return valve in said passage permitting flow into the pressure chamber, an outer chamber enclosing said seal and encircling said relatively movable part and a header tank charged with operating liquid and connected to this outer chamber and adapted to maintain said seal and passage drowned.

3. A hydraulic apparatus comprising a pressure cylinder, a cylinder head at each end thereof and rigid with said cylinder, a piston slidable within said cylinder, a piston rod extending on opposite sdes of said piston out through sad cylinder heads, high pressure sealing means between each of said heads and said piston rod, an outer chamber enclosing each sealing means and encircling said piston rod, an outer cylinder fixed with respect to said first named cylinder and adapted to provide a closed space between it and the first said cylinder, means placing the outer chamber in communication with said space, a header tank charged with operating liquid and communicating with said space.

4. A dashpot apparatus comprising a pressure cylinder, a cylinder head at each end thereof and rigid with said cylinder, a piston slidable within said cylinder, which piston is formed with a bleed passage, a piston rod extending on opposite sides of said piston out through said cylinder heads, which piston rod comprises a thermostatically operated valve adapted to control said bleed passage, a high pressure seal between said piston rod and each of said cylinder heads, an outer chamber enclosing each said seal and encircling said piston rod and a header tank charged with operating liquid and connected to this outer chamber and adapted to maintain said seal drowned.

5. A dashpot apparatus comprising a pressure cylinder, a cylinder head at each end thereof and rigid with said cylinder, a piston slidable within said cylinder, a bleed passage in said piston connecting the two sides thereof, a metal piston rod extending on opposite sides of said piston out through said cylinder heads, which piston rod is hollow on at least one side of said piston, a rod located within the hollow piston rod on one side of the piston and extending into said bleed passage, which rod is formed from a metal having a different coefficient of expansion than the metal of the hollow piston rod, and is fixed at the outer end to the piston rod, the other end of which rod is adapted reciprocating longitudinally within said rod, to control said bleed passage, a high pressure seal between said rod and each cylinder head, an outer chamber enclosing each said seal and encircling said piston rod and a header tank charged with operating liquid and connected to this outer chamber and adapted to maintain said seal drowned.

6. A dashpot apparatus comprising a pressure cylinder, a cylinder head at each end thereof, a piston in said cylinder, a bleed passage extending through said piston from one side to the other thereof, a metal piston rod extending on opposite sides of said piston out through said cylinder heads, which piston rod is hollow on at least one side of said piston, a rod located within the hollow piston rod on one side of the piston and extending into said bleed passage, which rod is formed from a metal having a different coefficient of expansion than the metal of the hollow piston rod, and is fixed at the outer end to the piston rod, means for adjusting said rod axially in relation to the piston rod, the other end of which rod is movable longitudinally within said bleed passage to control the flow of fluid therethrough, a high pressure seal between each cylinder head, an outer chamber enclosing each said seal and encircling said piston rod and a header tank charged with operating liquid and connected to this outer chamber and adapted to maintain said seal drowned.

7. A dashpot apparatus comprising a pressure cylinder, a cylinder head at each end thereof and rigid with said cylinder, a piston slidable within said cylinder, a bleed passage in said piston connecting the two sides thereof, a metal piston rod extending on opposite sides of said piston out through said cylinder heads, which piston rod is hollow on at least one side of said piston, a rod located within the hollow piston rod on one side of the piston and extending into said bleed passage, which rod is formed from a metal having a different coefficient of expansion than the metal of the hollow piston rod, and is fixed at the outer end to the piston rod, the other end of which rod is adapted to reciprocate longitudinally within said rod to control said bleed passage, and packing means between said rod and said cylinder heads.

8. A dashpot apparatus comprising a pressure cylinder, a cylinder head at each end thereof, a piston in said cylinder, a bleed passage extending through said piston from one side to the other thereof, a metal piston rod extending on opposite sides of said piston out through said cylinder heads, which piston rod is hollow on at least one side of said piston, a rod located within the hollow piston rod on one side of the piston and extending into said bleed passage, which rod is formed from a metal having a different coefficient of expansion than the metal of the hollow piston rod, and is fixed at the outer end to the piston rod, means for adjusting said rod axially in relation to the piston rod, the other end of which rod is movable longitudinally within said bleed passage to control the flow of fluid therethrough, and packing means between said rod and said cylinder heads.

FREDERICK WILLIAM MEREDITH.